United States Patent
Bower et al.

(10) Patent No.: US 9,576,113 B2
(45) Date of Patent: *Feb. 21, 2017

(54) USER PERMISSIONS BASED CONTROL OF POOLED FEATURES ON DEMAND ACTIVATION KEYS

(71) Applicant: International Business Machines Corporation, Armonk, NY (US)

(72) Inventors: Fred Bower, Durham, NC (US); David D. Chudy, Raleigh, NC (US); James G. McLean, Fuquay-Varina, NC (US); Cristian Medina, Durham, NC (US); Michael T. Shelton, Cary, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 359 days.

This patent is subject to a terminal disclaimer.

(21) Appl. No.: 14/133,560

(22) Filed: Dec. 18, 2013

(65) Prior Publication Data

US 2015/0169848 A1 Jun. 18, 2015

Related U.S. Application Data

(63) Continuation of application No. 14/107,024, filed on Dec. 16, 2013.

(51) Int. Cl.
*H04L 29/06* (2006.01)
*G06F 21/10* (2013.01)
*G07C 9/00* (2006.01)

(52) U.S. Cl.
CPC ......... *G06F 21/105* (2013.01); *G07C 9/00007* (2013.01); *H04L 63/105* (2013.01)

(58) Field of Classification Search
CPC ............................ G06F 9/4411; G06F 21/00
See application file for complete search history.

(56) References Cited

U.S. PATENT DOCUMENTS 6,324,645 B1  11/2001  Andrews et al.
7,761,921 B2  7/2010  Gannon et al.
(Continued)

OTHER PUBLICATIONS

Du, Q. et al., "A Scalable Encryption Scheme for Multi-Privileged Group Communications," Embedded and Ubiquitous Computing, IEEE/IFIP 8th Inter. Conf., Dec. 2010.

(Continued)

*Primary Examiner* — Jason K Gee
(74) *Attorney, Agent, or Firm* — Steven M. Greenberg, Esq.; CRGO Law

(57) ABSTRACT

Embodiments of the invention provide for user permissions based control of pooled FoD activation keys. In an embodiment of the invention, a method for user permissions based control of pooled FoD activation keys is provided. The method includes pooling one or more authorization codes for access by different end users in activating different features of a set of hardware components using FoD. The method also includes responding to an FoD request to activate one of the features by a particular one of the end users by determining whether or not a pre-defined code usage policy permits the particular one of the end users to use a pooled one of the authorization codes and if permitted according to the pre-defined code usage policy, generating an FoD activation key with the pooled one of the authorization codes and activating the one of the features with the FoD activation key.

7 Claims, 2 Drawing Sheets

(56) References Cited

U.S. PATENT DOCUMENTS

| | | |
|---|---|---|
| 2003/0070069 A1 | 4/2003 | Belapurkar et al. |
| 2005/0039061 A1* | 2/2005 | Schultz ................ G06F 21/10 713/310 |
| 2007/0107067 A1 | 5/2007 | Fountian |
| 2010/0005312 A1* | 1/2010 | Rom ...................... H04L 9/32 713/182 |
| 2010/0268768 A1 | 10/2010 | Kurtenbach et al. |
| 2012/0155635 A1 | 6/2012 | Vaikuntanathan et al. |

OTHER PUBLICATIONS

Chang, K. et al., "TGIS: Booting Trust for Secure Information Sharing in Dynamic Group Collaborations," IEEE, pp. 1020-1025, 2011.

Daza, V. et al., "Extensions of Access Structures and their Cryptographic Applications," Applicable Algebra in Engineering Communication and Computing, vol. 21, Jul. 2010.

* cited by examiner ise of the invention actually provide...

USER PERMISSIONS BASED CONTROL OF POOLED FEATURES ON DEMAND ACTIVATION KEYS

CROSS-REFERENCE TO RELATED APPLICATIONS

This application is a Continuation of U.S. application Ser. No. 14/107,024, filed Dec. 16, 2013, currently pending, the entirety of which is incorporated herein by reference.

BACKGROUND OF THE INVENTION

Field of the Invention

The present invention relates to software licensing and more particularly to features on demand (FoD) key authorization.

Description of the Related Art

FoD is a licensing procedure to enable both hardware and software features on certain servers and components. The components activated by FoD are already integrated into the server or adapter or other option, for example additional communications ports, disk storage protocols such as redundant array of independent disks (RAID) or network adapter enhancements such as Fibre Channel over Ethernet (FCoE) or Internet Small Computer System Interface (iSCSI). However, these components remain "locked" until an upgrade is activated and applied to the server through the acquisition and provision of an authorization code that is subsequently used to generate an activation key sufficient to "unlock" the desired feature or features. Consequently, FoD enables the customer to buy needed features on demand, for example access to additional hardware communications ports, while retaining the ability to enhance the system later with the needed additional ports, without requiring the customer to engage in hardware upgrades, which require costly, physical reconfiguration of the system. For those customers seeking access to the FoD components at the time of purchase of the server, the manufacturer can install an activation key on the server so that the FoD function is ready for use upon delivery of the server.

For field activation, the end user individually purchases the authorization code from the manufacturer and thereafter manually enters the authorization code into a user interface to acquire the activation keys entitled by the authorization code; the end user becomes the holder of the authorization code and the point of control for all authorizations of all components. Other end users requiring activation of features typically must request a key or this authorization code from an administrator who must account for used authorization credit and manage the distribution and utilization of the authorization code to acquire other activation keys for specific hardware elements to be unlocked. This cumbersome process results in delays and inefficiencies.

As another matter, once an authorization code has been used to create an activation key, there is no way at present to reassign the activation key to another device, or to reallocate credit for the authorization code to another user for use at a different time. Rather, because the activation key is bound to a specific instance of hardware, once the key has been generated, the key cannot be used to activate a different component on a different server. While a key library could be applied to overcome this deficiency, it remains impossible to prevent duplication of an activation key via simple copying. As such, a key library is impractical for managing the distribution of activation keys from the perspective of the manufacturer.

To account for the limitations of the authorization code distribution model, some software products make use of a license server approach. In the license server approach, a portion of software is centrally located in the customer environment and users obtain permission to use the portion of the software dynamically within limits established by the administrator of the license server. Limits may include a maximum capacity of simultaneous users, privilege-based user acquisition (in which users are only allowed to acquire a key if they have sufficient privilege), or a combination thereof.

The license server approach, however, is not applicable for the activation of hardware features as in FoD because hardware-based features typically must be activated during a system restart since they will often involve device reconfiguration that will require low-level reconfiguration before initializing an operating system. Also, the firmware operating environment in which this initialization occurs is not connected directly to a network and would require additional infrastructure to communicate with a license server at the time the activation permission is needed. Finally, there is no software agent that exists to relinquish the activation key once the key has been acquired and it would be inappropriate to forcibly restart a system with a key checked out in order to reallocate it to another system, even if the priority of the second system was greater than the priority of the key-holding, first system.

BRIEF SUMMARY OF THE INVENTION

Embodiments of the present invention address deficiencies of the art in respect to FoD authorization code distribution and activation key management, and provide a novel and non-obvious method, system and computer program product for user permissions based control of pooled FoD activation keys. In an embodiment of the invention, a method for user permissions based control of pooled FoD activation keys is provided. The method includes pooling one or more authorization codes for access by different end users in activating different features of a set of hardware components using FoD. The method also includes responding to an FoD request to activate one of the features by a particular one of the end users by determining whether or not a pre-defined code usage policy permits the particular one of the end users to use a pooled one of the authorization codes and if permitted according to the pre-defined code usage policy, generating an FoD activation key with the pooled one of the authorization codes and activating the one of the features with the FoD activation key.

In one aspect of the embodiment, an already existing FoD activation key is used to activate the one of the features in lieu of generating an FoD activation key in response to the FoD request. In another aspect of the embodiment, the pre-defined code usage policy limits an end user in utilizing the pooled one of the authorization codes based upon any combination of an identity of the end user, a type of an FoD activation key necessary to activate the one of the features, a cost of an FoD activation key necessary to activate the one of the features, a cost of the pooled one of the authorization codes, or a total number of authorization codes in use by the end user and a total number of FoD activation keys generated utilizing the pooled one of the authorization codes.

In another embodiment of the invention, a computer data processing system is configured for user permissions based control of pooled FoD activation keys. The system includes one or more hardware components each including at least one feature configured for activation according to FoD. The system also includes a memory with a pool of one or more authorization codes for access by different end users in activating different features of the hardware components using FoD. Finally, the system includes an FoD activation module executing in memory of the computer data processing system. The module includes computer program code enabled upon execution to respond to an FoD request to activate one of the features by a particular one of the end users by determining whether or not a pre-defined code usage policy permits the particular one of the end users to use a pooled one of the authorization codes and if permitted according to the pre-defined code usage policy, generating an FoD activation key with the pooled one of the authorization codes and activating the one of the features with the FoD activation key.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for user permissions based control of pooled FoD activation keys. In accordance with an embodiment of the invention, a set of authorization codes can be placed in a pool in connection with one or more hardware components and one or more code usage policies can be defined specifying limits on the access and utilization of the authorization codes for different end users or end user roles. Thereafter, an FoD request can be received to activate a feature of the hardware components from a particular end user and the code usage policies can be analyzed to determine whether or not the request is permitted. If not, the request is denied. Otherwise, it can be determined whether or not an activation key already exists for the subject of the FoD request. If not, an authorization code in the pool can be used to generate an FoD activation key. Thereafter, the FoD activation key whether newly generated or pre-existing can be used to activate the feature and a use record for the FoD activation key can be updated. In this way, flexibility in FoD can be maintained in the re-assignment of an FoD activation key or the re-use of an authorization code amongst several end users.

Figure 1:
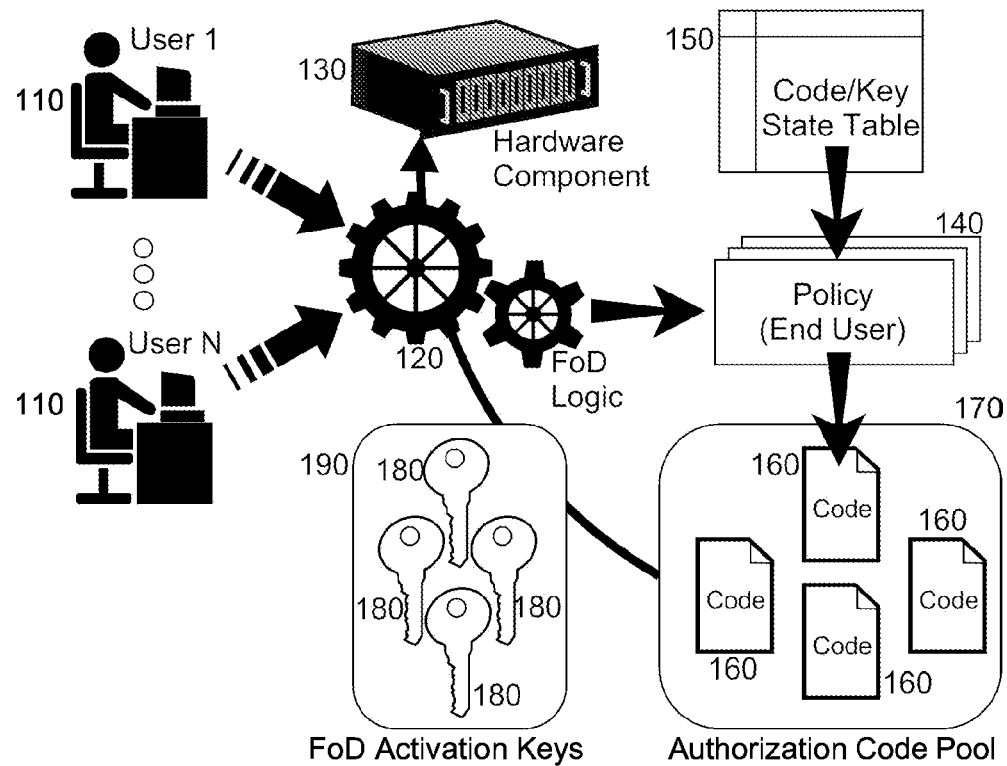
FIG. 1 is a pictorial illustration of a process for user permissions based control of pooled FoD activation keys.

In further illustration, FIG. 1 pictorially shows a process for user permissions based control of pooled FoD activation keys. As shown in FIG. 1, different end users 110 can access FoD logic 120 in order to request activation of a feature of a hardware component 130. For each one of the different end users 110 requesting activation of a feature of the hardware component, the FoD logic 120 can apply one or more policies 140 to the end user to determine whether or not the requesting one of the end users 110 is eligible to access an authorization code 160 within a pool 170 of authorization codes 160 to acquire an FoD activation key 180 so as to activate the requested feature.

In this regard, the policies 140 can consider a contemporaneous state 150 of the authorization codes 160 and keys 180 and the identity of the requesting one of the end users 110 when applying a rule to determine whether or not the requesting one of the end users 110 is eligible to access an authorization code 160 to acquire an FoD activation key 180 to activate the feature. To the extent that the required one of the FoD activation keys 180 already exists in a set 190 of existing FoD activation keys 180, the required one of the FoD activation keys 180 can be selected for use in activating the requested feature. Otherwise, an authorization code 160 within the pool 170 can be used to generate the required one of the FoD activation keys 180.

Figure 2:
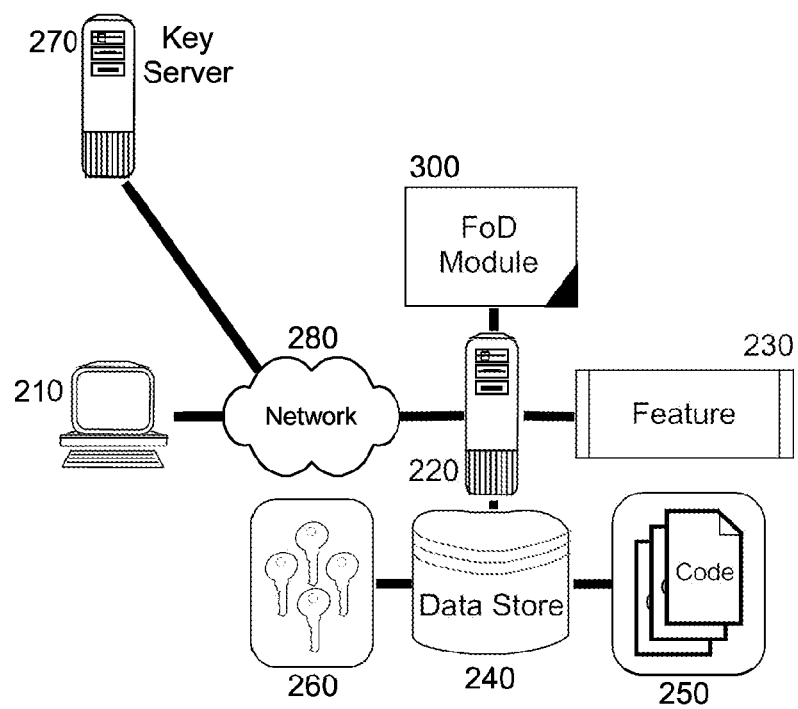
FIG. 2 is a schematic illustration of a data processing system configured for user permissions based control of pooled FoD activation keys; and, FIG. 3 is a flow chart illustrating a process for user permissions based control of pooled FoD activation keys.

The process described in connection with FIG. 1 can be implemented within a data processing system of one or more computers, each having memory and one or more processors, communicatively coupled to one another over a communications network. More specifically, FIG. 2 schematically shows a data processing system configured for user permissions based control of pooled FoD activation keys. The system can include a host computing system 220 with one more hardware components having one or more features 230 (only a single feature shown for the ease of illustrative simplicity).

The host computing system 220 can be accessed by a client computing device 210 over computer communications network 280 over which the client computing device 210 on behalf of an end user can issue a request to an FoD module 300 to activate the feature 230. In particular, the FoD module 300 can execute in the memory of the host computing system 220 and can include computer program code enabled to apply one or more policies with respect to the end user in order to determine whether or not the end user is able to access an authorization code 250 in data store 240 sufficient to acquire an a required one of a set of FoD activation keys 260 necessary to activate the feature 230. The program code of the FoD module 300 also can be enabled to utilize an existing one of the FoD activation keys 260, or to submit an authorization code 250 to remotely disposed key server 270 so as to provision generation of the required one of the FoD activation keys 260.

Figure 3:
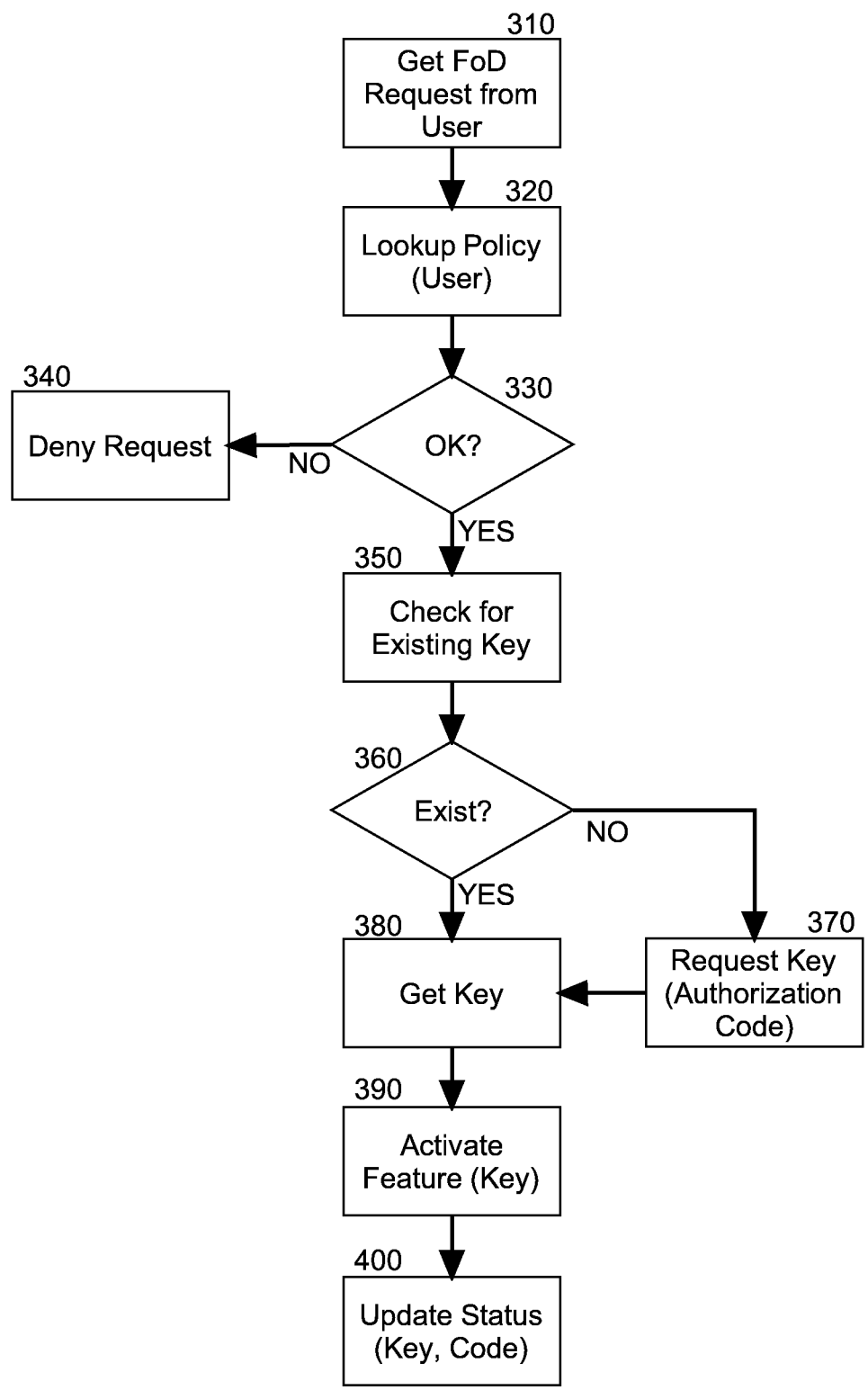

In even yet further illustration of the operation of the FoD module 300, FIG. 3 is a flow chart illustrating a process for user permissions based control of pooled FoD activation keys. Beginning in block 310, a request can be received from an end user to activate a feature of a hardware component in a computing system and in block 320, a policy can be applied to the end user to determine whether or not the end user is eligible to access an authorization code to acquire an FoD key to activate the feature. For example, the policy can permit or deny access to an end user of a particular identity. The policy also can permit or deny access to the end user based upon a type of an FoD activation key necessary to activate the feature, a cost of an FoD activation key necessary to activate the feature, or a cost of the authorization code. The policy yet further can permit or deny access to the end user based upon a total number of authorization codes in use by the end user, or a total number of FoD activation keys generated utilizing the pooled one of the authorization codes. Of course, any combination of the foregoing can be included in the policy.

In decision block 330, it can be determined whether or not end user is permitted to access an authorization code so as to acquire an FoD activation key to activate the feature. If not, the request can be denied in block 340. Otherwise, in block 350 an existing one of the FoD activation codes necessary to activate the feature can be located. If the necessary FoD activation code is determined to already exist in decision block 360, the existing FoD activation code can be acquired. Otherwise, in block 370 the necessary FoD activation code can be generated in block 370 utilizing the authorization code. In block 390, the feature can be activated using the necessary FoD activation code and in block 400, a contemporaneous status of the authorization code and the necessary FoD activation code can be updated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for user permissions based control of pooled feature-on-demand (FoD) activation keys, the method comprising:

pooling in a memory of a computer data processing system multiple different authorization codes for access by different end users in activating different features of a set of hardware components of the computer data processing system using FoD; and, responding to an FoD request to activate one of the features by a particular one of the end users by determining whether or not a pre-defined code usage policy permits the particular one of the end users to use a pooled one of the authorization codes and, in response to a determination that the pre-defined code usage policy permits the particular one of the end users to use a pooled one of the authorization codes, determining if a FoD activation key already exists for activating the one of the features and if not, transmitting a request to a remotely disposed key server requesting generation by the key server of an FoD activation key using the pooled one of the authorization codes and activating the one of the features with the generated FoD activation key subsequent to receiving the generated FoD activation key from the key server.

2. The method of claim 1, wherein the pre-defined code usage policy limits an end user in utilizing the pooled one of the authorization codes based upon an identity of the end user.

3. The method of claim 1, wherein the pre-defined code usage policy limits an end user in utilizing the pooled one of the authorization codes based upon a type of an FoD activation key necessary to activate the one of the features.

4. The method of claim 1, wherein the pre-defined code usage policy limits an end user in utilizing the pooled one of the authorization codes based upon a cost of an FoD activation key necessary to activate the one of the features.

5. The method of claim 1, wherein the pre-defined code usage policy limits an end user in utilizing the pooled one of the authorization codes based upon a cost of the pooled one of the authorization codes.

6. The method of claim 1, wherein the pre-defined code usage policy limits an end user in utilizing the pooled one of the authorization codes based upon a total number of authorization codes in use by the end user.

7. The method of claim 1, wherein the pre-defined code usage policy limits an end user in utilizing the pooled one of the authorization codes based upon a total number of FoD activation keys generated utilizing the pooled one of the authorization codes.

* * * * *